(12) United States Patent
Liu et al.

(10) Patent No.: US 10,906,754 B2
(45) Date of Patent: Feb. 2, 2021

(54) APPARATUS AND METHOD FOR MANUFACTURING LIQUID CRYSTAL PANEL

(71) Applicant: Wuhan China Star Optoelectronics Technology Co., Ltd., Hubei (CN)

(72) Inventors: Song Liu, Guangdong (CN); Jingchen Yan, Guangdong (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 89 days.

(21) Appl. No.: 16/236,388

(22) Filed: Dec. 29, 2018

(65) Prior Publication Data

US 2019/0367294 A1   Dec. 5, 2019

Related U.S. Application Data

(63) Continuation of application No. PCT/CN2018/107453, filed on Sep. 26, 2018.

(30) Foreign Application Priority Data

May 29, 2018 (CN) ........................ 2018 1 0534395

(51) Int. Cl.
    *B65G 47/91* (2006.01)
    *G02F 1/13* (2006.01)
    *G02F 1/1339* (2006.01)

(52) U.S. Cl.
    CPC ........... *B65G 47/91* (2013.01); *G02F 1/1303* (2013.01); *G02F 1/1339* (2013.01)

(58) Field of Classification Search
CPC ............... B65G 47/91; B65G 2249/04; B65G 2249/02; B65G 49/065; B65G 51/03; B65G 2201/022; G02F 1/1303; G02F 1/1339
See application file for complete search history.

(56) References Cited

U.S. PATENT DOCUMENTS

2006/0219605 A1  10/2006  Devitt
2015/0360455 A1*  12/2015  Fujiwara ............... B05B 12/084
                                                      156/275.5

FOREIGN PATENT DOCUMENTS

| CN | 101359114 A | 2/2009 |
|---|---|---|
| CN | 101489893 A | 7/2009 |
| CN | 102385186 A | 3/2012 |
| CN | 106405946 A | 2/2017 |

* cited by examiner

*Primary Examiner* — Vishal I Patel

(57) ABSTRACT

This application discloses an apparatus for manufacturing a liquid crystal panel and a method for manufacturing a liquid crystal panel. The manufacturing apparatus includes a vacuum attaching station, a pneumatic transmission mechanism and a sealant curing station, the vacuum attaching station is configured to support the liquid crystal panel on which sealant coating and substrate attaching have been completed, the pneumatic transmission mechanism is disposed at the vacuum attaching station and between the vacuum attaching station and the sealant curing station, the pneumatic transmission mechanism is provided with a plurality of air holes, and an angle included between an air discharging direction of the air holes and the liquid crystal panel is an acute angle.

5 Claims, 2 Drawing Sheets

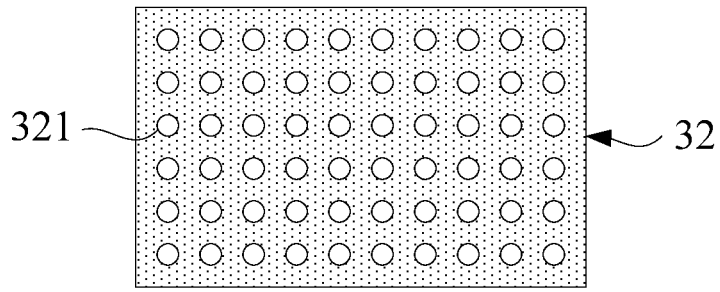

FIG. 4

| Providing a pneumatic transmission mechanism, the pneumatic transmission mechanism being disposed at the vacuum attaching station and between the vacuum attaching station and the sealant curing station and being provided with a plurality of air holes, wherein the vacuum attaching station is configured to support the liquid crystal panel on which sealant coating and substrate attaching have been completed | ~ S51 |

↓

| Discharging the air through the air holes at an air discharging direction that forms an acute angle with the liquid crystal panel, and moving the liquid crystal panel from the vacuum attaching station to the sealant curing station | ~ S52 |

FIG. 5

APPARATUS AND METHOD FOR MANUFACTURING LIQUID CRYSTAL PANEL

CROSS-REFERENCE TO RELATED APPLICATIONS

The present application is a continuation-application of International (PCT) Patent Application No. PCT/CN2018/107453 filed on Sep. 26, 2018, which claims foreign priority of Chinese Patent Application No. 201810534395.1, filed on May 29, 2018 in the National Intellectual Property Administration of China, the entire contents of which are hereby incorporated by reference.

TECHNICAL FIELD

This application relates to the field of displaying technologies, and more particularly, relates to an apparatus for manufacturing a liquid crystal panel and a method for manufacturing a liquid crystal panel.

BACKGROUND

During the one-drop-filling (ODF) process of a liquid crystal panel, a vacuum assembly chamber (VAC) performs sealant coating and attaching on a thin film transistor (TFT) substrate and a color filter (CF) substrate under vacuum environment, and a sealant cure oven (e.g., sealant ultraviolet (SUV) cure oven) is used to cure the sealant to complete the assembling of the two substrates. There are three main factors affecting the assembling precision: the first one is the degree of matching between the TFT substrate and the CF substrate; the second one is the attaching performance of the vacuum assembly chamber; and the third one is the variance of the sealant after the TFT substrate and the CF substrate are attached and before the curing of the sealant. The first factor can be improved by product adjustment, the second factor can be improved by improving the vacuum assembly chamber, but the third factor is difficult to be effectively controlled.

With reference to FIG. 1 and FIG. 2, after sealant coating and attaching of a liquid crystal panel 20 is completed, a supporting element (e.g., a bar) 111 on a vacuum assembly chamber 11 ascends, a robot arm 12 supports the liquid crystal panel 20 via a fork 121 and transfers the liquid crystal panel 20 on a supporting element (e.g., a bar) 131 of a sealant cure oven 13, and the supporting element 131 descends to place the liquid crystal panel 20 on a machine table of the sealant cure oven 13, thereby curing the sealant. During this process, the ascending of the supporting element 111, the transferring of the robot arm 12 and the descending of the supporting element 131 all affect the assembling precision of the liquid crystal panel 20.

SUMMARY

Accordingly, this application provides an apparatus for manufacturing a liquid crystal panel and a method for manufacturing a liquid crystal panel, which help to ensure the assembling precision of the liquid crystal panel.

An apparatus for manufacturing a liquid crystal panel according to an embodiment of this application includes a vacuum attaching station, a pneumatic transmission mechanism, a sealant curing station having a machine table configured to support the liquid crystal panel and a drive mechanism connected with the machine table, the drive mechanism is configured to drive the machine table to move upward and downward, the vacuum attaching station is configured to support the liquid crystal panel on which sealant coating and substrate attaching have been completed, the pneumatic transmission mechanism is disposed at the vacuum attaching station and between the vacuum attaching station and the sealant curing station, the pneumatic transmission mechanism is provided with a plurality of air holes, an angle included between an air discharging direction of the air holes and the liquid crystal panel is an acute angle, and the liquid crystal panel moves always along a same horizontal plane under the action of the air discharged through the air holes.

An apparatus for manufacturing a liquid crystal panel according to an embodiment of this application includes a vacuum attaching station, a pneumatic transmission mechanism and a sealant curing station, the vacuum attaching station is configured to support the liquid crystal panel on which sealant coating and substrate attaching have been completed, the pneumatic transmission mechanism is disposed at the vacuum attaching station and between the vacuum attaching station and the sealant curing station, the pneumatic transmission mechanism is provided with a plurality of air holes, and an angle included between an air discharging direction of the air holes and the liquid crystal panel is an acute angle.

A method for manufacturing a liquid crystal panel according to an embodiment of this application includes:

providing a pneumatic transmission mechanism, the pneumatic transmission mechanism is disposed at a vacuum attaching station and between the vacuum attaching station and a sealant curing station and being provided with a plurality of air holes, wherein the vacuum attaching station is configured to support the liquid crystal panel on which sealant coating and substrate attaching have been completed; and discharging the air through the air holes at an air discharging direction that forms an acute angle with the liquid crystal panel, and moving the liquid crystal panel from the vacuum attaching station to the sealant curing station.

Benefits: in this application, the pneumatic transmission mechanism is designed to be disposed at the vacuum attaching station and between the vacuum attaching station and the sealant curing station, the pneumatic transmission mechanism replaces the conventional robot arm, and moves the liquid crystal panel on which the sealant coating and substrate attaching have been completed to the sealant curing station by an air discharging operation. During the whole transferring process, the liquid crystal panel does not need to move upward and downward, so vibration caused by upward and downward movement can be avoided, and the assembling precision of the liquid crystal panel can be ensured.

BRIEF DESCRIPTION OF THE DRAWINGS

FIG. 4 is a structural top view of a pneumatic transmission mechanism of FIG. 3.

FIG. 5 is a schematic flowchart diagram of a method for manufacturing a liquid crystal panel according to an embodiment of this application.

DETAILED DESCRIPTION

A primary objective of this application is to provide a pneumatic transmission mechanism that is located at a vacuum attaching station and between the vacuum attaching station and a sealant curing station, the pneumatic transmission mechanism replaces the conventional robot arm, and moves the liquid crystal panel on which the sealant coating and substrate attaching have been completed to the sealant curing station by an air discharging operation. During the whole transferring process, the liquid crystal panel does not need to move upward and downward, so vibration caused by the upward and downward movement can be avoided, and the assembling precision of the liquid crystal panel can be ensured.

Technical solutions of exemplary embodiments provided in this application will be described clearly and completely hereinafter with reference to attached drawings in the embodiments of this application. The following embodiments and features in the embodiments can be combined with each other without conflicting with each other. Moreover, directional terms adopted throughout this application, e.g., "upper", "lower" or the like, are all used for better describing the technical solutions of the embodiments rather than for limiting the claimed scope of this application.

Figure 3:
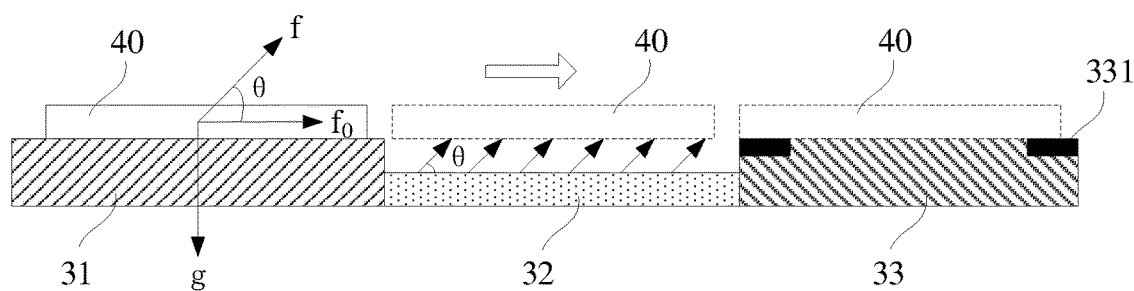
FIG. 3 is a schematic structural view of an apparatus for manufacturing a liquid crystal panel according to an embodiment of this application.

FIG. 3 is a schematic structural view of an apparatus for manufacturing a liquid crystal panel according to an embodiment of this application. The manufacturing apparatus is used for the ODF process of the liquid crystal panel, and is at least used for achieving sealant coating and attaching of a TFT substrate and a CF substrate under vacuum environment, as well as the curing of the sealant. As shown in FIG. 3, the manufacturing apparatus includes a vacuum attaching station 31, a pneumatic transmission mechanism 32 and a sealant curing station 33, and these elements may be connected with a programmable logic controller (PLC) and controlled by the PLC to perform respective operations thereof.

The vacuum attaching station 31 is configured to support the TFT substrate and the CF substrate and accomplish the sealant coating and the attachment of the two substrates, and it may be regarded as a conventional vacuum assembly chamber.

The sealant curing station 33 is configured to support the liquid crystal panel 40 on which the sealant coating and the substrate attaching have been completed and cure the sealant thereof, and it is equivalent to the conventional sealant cure oven.

The pneumatic transmission mechanism 32 is disposed at the vacuum attaching station 31 and between the vacuum attaching station 31 and the sealant curing station 33. With reference to FIG. 4, a plurality of air holes 321 are opened on the upper surface of the pneumatic transmission mechanism 32, these air holes 321 are used for discharging air to the liquid crystal panel 40, which is equivalent to applying a pneumatic floating force to the liquid crystal panel 40, thereby moving the liquid crystal panel 40 on which the sealant coating and the substrate attaching have been completed from the vacuum attaching station 31 to the sealant curing station 33.

Specifically, after the sealant coating and the substrate attaching are completed on the liquid crystal panel 40, the air holes 321 of the pneumatic transmission mechanism 32 that are located at the vacuum attaching station 31 discharge air, and an angle θ included between an air discharging direction of the air holes 321 and the liquid crystal panel 40 is an acute angle. At this point, the liquid crystal panel 40 is under the action of the pneumatic floating force f and the gravity g, and because the angle included between the pneumatic floating force f and the horizontal direction is θ, and the direction of the gravity is vertically downward, a transferring force $f_0$ that is in the horizontally rightward direction is finally exerted on the liquid crystal panel 40 when the liquid crystal panel 40 is under the action of the aforesaid two forces. Thus, the liquid crystal panel 40 is moved away from the vacuum attaching station 31 under the action of the transferring force $f_0$ until the liquid crystal panel 40 is completely supported on the sealant curing station 33.

Figure 1:
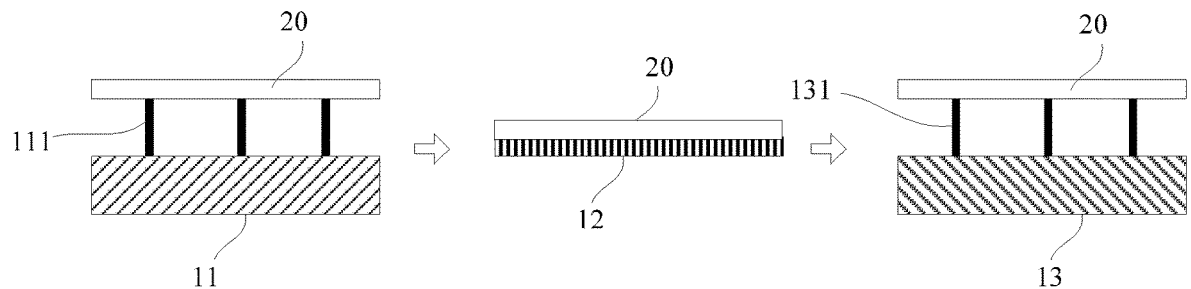
FIG. 1 is a schematic view illustrating a scene of transferring a liquid crystal panel according to an embodiment in the related art.
Figure 2:
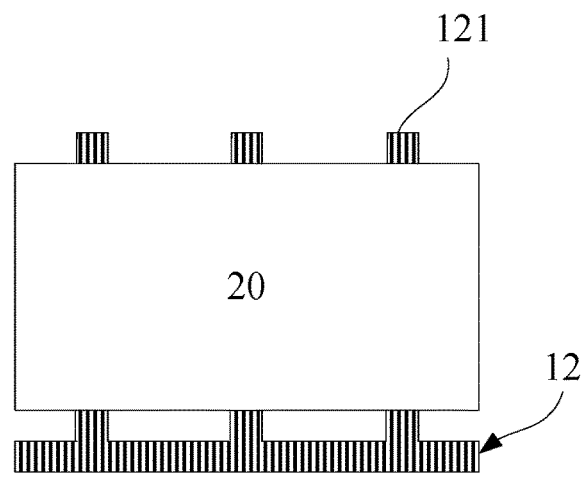
FIG. 2 is a structural top view illustrating a robot arm transferring the liquid crystal panel of FIG. 1.

During the whole transferring process, the liquid crystal panel 40 always moves along a same horizontal plane. The liquid crystal panel 40 is not raised during the process of being moved away from the vacuum attaching station 31, and the liquid crystal panel 40 is not lowered during the process of being moved to the sealant curing station 33. Therefore, as compared to the related art shown in FIG. 1, this application can avoid the vibration of the liquid crystal panel 40 caused by the upward and downward operations, thereby ensuring the assembling precision of the liquid crystal panel 40.

On the basis of the above description, this application may provide an air flow adjuster at the air holes 321, and the air flow adjuster timely adjusts the air discharging direction of the air holes 321 according to the weight of the liquid crystal panel 40 to be transferred and the posture of the liquid crystal panel 40 during the transferring process or the like so that the liquid crystal panel 40 being transferred always moves along the same horizontal plane.

For the case where the top surface of the machine table of the sealant curing station 33 is not level with the horizontal plane, i.e., there are differences in heights of the top surface of the machine table of the sealant curing station 33, the top surface of the machine table of the vacuum attaching station 31, and a supporting surface formed by the pneumatic transmission mechanism 32 through discharging air between the sealant curing station 33 and the vacuum attaching station 31, this application may dispose the machine table of the sealant curing station 33 as a structure that can be lifted and lowered, and the machine table of the sealant curing station 33 may be connected with a drive mechanism, e.g., a motor. After the liquid crystal panel 40 is moved above the sealant curing station 33, the drive mechanism drives the upward movement of the machine table of the sealant curing station 33 if the top surface of the machine table of the sealant curing station 33 is lower than the horizontal plane until the top surface of the machine table is level with the horizontal plane; and the drive mechanism drives the downward movement of the machine table of the sealant curing station 33 if the top surface of the machine table of the sealant curing station 33 is higher than the horizontal plane.

Further, the sealant curing station 33 may be provided with sensors 331, e.g., distance sensors, and the sensors 331 may be inserted into the machine table of the sealant curing station 33 and may be configured to detect whether the liquid crystal panel 40 completely contacts with the machine table of the sealant curing station 33. After it is monitored that the liquid crystal panel 40 completely contacts with the machine table of the sealant curing station 33, the pneumatic transmission mechanism 32 may stop discharging air, and the sealant curing station 33 performs sealant curing.

In order to achieve a better detecting effect with as few devices as possible, the number of the sensors 331 may be at least four and the sensors 331 are respectively disposed at four corners of the machine table of the sealant curing station 33.

FIG. 5 is a schematic flowchart diagram of a method for manufacturing a liquid crystal panel according to an embodiment of this application. As shown in FIG. 5, the manufacturing method includes the following blocks S51 and S52.

S51: providing a pneumatic transmission mechanism, the pneumatic transmission mechanism is disposed at a vacuum attaching station and between the vacuum attaching station and a sealant curing station and is provided with a plurality of air holes, wherein the vacuum attaching station is configured to support the liquid crystal panel on which sealant coating and substrate attaching have been completed.

S52: discharging the air through the air holes at an air discharging direction that forms an acute angle with the liquid crystal panel, and moving the liquid crystal panel from the vacuum attaching station to the sealant curing station.

The manufacturing method of this embodiment may be implemented based on the aforesaid manufacturing apparatus.

Herein, after the sealant coating and the substrate attaching are completed on the liquid crystal panel, the air holes of the pneumatic transmission mechanism that are located at the vacuum attaching station discharge air, and an angle included between an air discharging direction of the air holes and the liquid crystal panel is an acute angle. At this point, the liquid crystal panel is under the action of the pneumatic floating force and the gravity, and because the angle included between the pneumatic floating force and the horizontal direction is an acute angle, and the direction of the gravity is vertically downward, a transferring force that is in the horizontally rightward direction is finally exerted on the liquid crystal panel when the liquid crystal panel is under the action of the aforesaid two forces. Thus, the liquid crystal panel is moved away from the vacuum attaching station under the action of the transferring force until the liquid crystal panel is completely supported on the sealant curing station.

During the whole transferring process, the liquid crystal panel always moves along a same horizontal plane. The liquid crystal panel is not raised during the process of being moved away from the vacuum attaching station, and the liquid crystal panel is not lowered during the process of being moved to the sealant curing station. Therefore, as compared to the related art shown in FIG. 1, this application can avoid the vibration of the liquid crystal panel caused by the upward and downward operations, thereby ensuring the assembling precision of the liquid crystal panel.

Additionally, in the block S52, the manufacturing method may use an air flow adjuster disposed at the air holes to timely adjust the air discharging direction of the air holes according to the weight of the liquid crystal panel to be transferred and the posture of the liquid crystal panel during the transferring process or the like so that the liquid crystal panel being transferred always moves along the same horizontal plane.

For the case where the top surface of the machine table of the sealant curing station is not level with the horizontal plane, the manufacturing method may use a drive mechanism connected with the machine table of the sealant curing station to drive the upward movement of the machine table if the top surface of the machine table of the sealant curing station is lower than the horizontal surface when the liquid crystal panel is moved above the sealant curing station. If the top surface of the machine table of the sealant curing station is higher than the horizontal plane, the manufacturing method may use the drive mechanism to drive the downward movement of the machine table of the sealant curing station.

Further, the manufacturing method may use sensors disposed on the sealant curing station 33 to detect whether the liquid crystal panel completely contacts with the machine table of the sealant curing station. After it is monitored that the liquid crystal panel completely contacts with the machine table of the sealant curing station, the manufacturing method may control the pneumatic transmission mechanism to stop discharging air, and the sealant curing station performs sealant curing. In order to achieve a better detecting effect with as few devices as possible, the number of the sensors may be at least four and the sensors are respectively disposed at four corners of the machine table of the sealant curing station.

What described above are only the embodiments of the present disclosure, but are not intended to limit the scope of the present disclosure. Any equivalent structures or equivalent process flow modifications that are made according to the specification and the attached drawings of the present disclosure, or any direct or indirect applications of the present disclosure in other related technical fields shall all be covered within the scope of the present disclosure.

What is claimed is:

1. An apparatus for manufacturing a liquid crystal panel, comprising:
a vacuum attaching station;
a pneumatic transmission mechanism; and
a sealant curing station having a machine table and a drive mechanism, wherein the machine table is configured to support the liquid crystal panel, and the drive mechanism is connected with the machine table; and
wherein the vacuum attaching station is configured to support the liquid crystal panel on which sealant coating and substrate attaching have been completed, the pneumatic transmission mechanism is disposed at the vacuum attaching station and between the vacuum attaching station and the sealant curing station, the pneumatic transmission mechanism is provided with a plurality of air holes, an angle included between an air discharging direction of the air holes and the liquid crystal panel is an acute angle, and the liquid crystal panel moves always along a same horizontal plane under the action of the air discharged through the air holes,
wherein the drive mechanism is configured to drive the machine table to move upward and downward until a top surface of the machine table is level with the same horizontal plane.

2. The manufacturing apparatus of claim 1, wherein the pneumatic transmission mechanism further comprises an air flow adjuster disposed at the air holes for adjusting the air discharging direction of the air holes.

3. The manufacturing apparatus of claim 2, wherein the sealant curing station further comprises sensors for detecting whether the liquid crystal panel completely contacts with the machine table.

4. The manufacturing apparatus of claim 3, wherein the sensors are at least disposed at four corners of the machine table of the sealant curing station.

5. The manufacturing apparatus of claim 3, wherein the sensors comprise a distance sensor.

* * * * *